(12) United States Patent
Sullivan et al.

(10) Patent No.: US 10,443,806 B2
(45) Date of Patent: Oct. 15, 2019

(54) HOMOGENOUS LED VEHICLE LAMP

(71) Applicant: Flex-N-Gate Advanced Product Development, LLC, Tecumseh (CA)

(72) Inventors: Les Sullivan, Wyoming, MI (US); Todd Nykerk, Holland, MI (US)

(73) Assignee: Flex-N-Gate Advanced Product Development, Inc., Tecumseh (CA)

( * ) Notice: Subject to any disclaimer, the term of this patent is extended or adjusted under 35 U.S.C. 154(b) by 0 days.

(21) Appl. No.: 15/851,880

(22) Filed: Dec. 22, 2017

(65) Prior Publication Data

US 2018/0180244 A1 Jun. 28, 2018

Related U.S. Application Data

(60) Provisional application No. 62/437,906, filed on Dec. 22, 2016.

(51) Int. Cl.
*B60Q 1/44* (2006.01)
*F21S 4/00* (2016.01)
(Continued)

(52) U.S. Cl.
CPC ............... *F21S 43/26* (2018.01); *B60Q 1/44* (2013.01); *F21S 43/14* (2018.01); *F21S 43/15* (2018.01);
(Continued)

(58) Field of Classification Search
CPC . F21S 43/14; F21S 43/15; F21S 43/26; B60Q 1/44; B60Q 1/302; F21Y 2103/10; F21V 3/049; F21V 3/0615; F21V 3/0625
See application file for complete search history.

(56) References Cited

U.S. PATENT DOCUMENTS 7,267,466 B2 9/2007 Reiss
7,374,322 B2 5/2008 Steen et al.
(Continued)

FOREIGN PATENT DOCUMENTS

EP 3330595 A1 * 6/2018 ............. F21S 43/19
KR 1020090102019 A 9/2009
RU 134862 U1 11/2013

OTHER PUBLICATIONS

PCT Patent Application PCT/US2017/068086 International Search Report and Written Opinion dated Apr. 5, 2018.

*Primary Examiner* — Alan B Cariaso
(74) *Attorney, Agent, or Firm* — Erise IP, P.A.

(57) ABSTRACT

A homogenous light-emitting diode (LED) lamp for an automotive vehicle is provided that includes multiple LEDs configured as a LED array and a diffusion sheet. The diffusion sheet has a curvature aligned with the LED array for smoothing and bending light emitted by the LEDs for the purpose of creating a lighting appearance substantially lacking hotspots. An automotive vehicle lamp for producing homogenous light is provided. The vehicle lamp includes multiple LEDs each positioned a first distance apart from one another to form an array of LEDs, and a diffusion sheet positioned a second distance from the array of LEDs for smoothing light emitted from the array of LEDs. The first distance and the second distance are arranged for the purpose of providing a substantially homogenous light output from the vehicle lamp when viewed through the diffusion sheet.

17 Claims, 4 Drawing Sheets

(51) Int. Cl.
*F21V 3/02* (2006.01)
*F21S 43/20* (2018.01)
*F21V 3/04* (2018.01)
*F21S 43/14* (2018.01)
*F21S 43/15* (2018.01)
*F21Y 103/10* (2016.01)
*F21Y 115/10* (2016.01)
*B60Q 1/30* (2006.01)

(52) U.S. Cl.
CPC .............. *F21V 3/049* (2013.01); *B60Q 1/302* (2013.01); *F21Y 2103/10* (2016.08); *F21Y 2115/10* (2016.08)

(56) References Cited

U.S. PATENT DOCUMENTS

| | | | |
|---|---|---|---|
| 9,194,566 B2 | 11/2015 | Oh | |
| 2002/0191386 A1* | 12/2002 | Cleaver | F21V 5/00 362/628 |
| 2004/0120160 A1* | 6/2004 | Natsume | B60Q 1/0058 362/544 |
| 2012/0033420 A1* | 2/2012 | Kim | F21K 9/00 362/235 |
| 2015/0138802 A1* | 5/2015 | Salter | B60Q 1/56 362/510 |
| 2016/0362042 A1* | 12/2016 | Ovenshire | B60Q 1/0076 |
| 2018/0257557 A1* | 9/2018 | Bruegl | B60Q 3/64 |

* cited by examiner

HOMOGENOUS LED VEHICLE LAMP

CROSS-REFERENCE TO RELATED APPLICATIONS

This application claims the benefit of U.S. Provisional Patent Application Ser. No. 62/437,906 entitled Homogenous LED and filed on Dec. 22, 2016, the disclosure of which is herein incorporated by reference in its entirety.

BACKGROUND

1. Field of the Disclosure

Embodiments of this disclosure relate generally to systems to control light output, and more specifically to non-imaging optics to control light output from a plurality of light-emitting diodes (LEDs) for an automotive vehicle lamp.

2. Description of the Related Art

U.S. Pat. No. 7,267,466 to Reiss discloses a cargo lamp assembly for vehicles with a white LED and a lens for focusing light emitted from the LED.

U.S. Pat. No. 7,374,322 to Steen et al. discloses a center high mounted stop lamp having a plurality of LEDs mounted on a printed circuit board. Each LED is aligned with a total internal reflecting lens which each include a prism for directing light from its respective LED.

SUMMARY

In an embodiment, a homogenous light-emitting diode (LED) lamp for an automotive vehicle is provided. The homogenous LED includes a plurality of LEDs configured as a LED array. A diffusion sheet is provided that has a curvature aligned with the LED array for smoothing and bending light emitted by the plurality of LEDs for the purpose of creating a lighting appearance substantially lacking hotspots.

In another embodiment, an automotive vehicle lamp for producing homogenous light is provided. The vehicle lamp includes a plurality of LEDs each positioned a first distance apart from one another to form an array of LEDs, and a diffusion sheet positioned a second distance from the array of LEDs for smoothing light emitted from the array of LEDs. The first distance and the second distance are arranged for the purpose of providing a substantially homogenous light output from the vehicle lamp when viewed through the diffusion sheet.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

A light-emitting diode (LED) produces light when activated by a suitable voltage applied across a semiconductor p-n junction diode. For many illumination applications, light emitted by LEDs may be modified using non-imaging optics such as one or more lenses. However, a disadvantage of using lenses is that a complex system of lenses is typically required to achieve a uniform and homogenous appearing light output from a plurality of LEDs while still meeting output-angle luminance requirements for certain applications. Additional disadvantages of using lenses include a non-contiguous appearance due to the separation of the focal reflectors, and shadowing due to various thicknesses in a typical lens optic.

Embodiments of the present disclosure provide a vehicle lamp that uses LEDs as the light source. In certain embodiments, the LED vehicle lamp is a Center-High-Mounted Stop Lamp (CHMSL). CHMSLs are used in passenger cars and light trucks and are required to meet regulations governing luminance, viewing angle, and contrast ratio.

Figure 1:
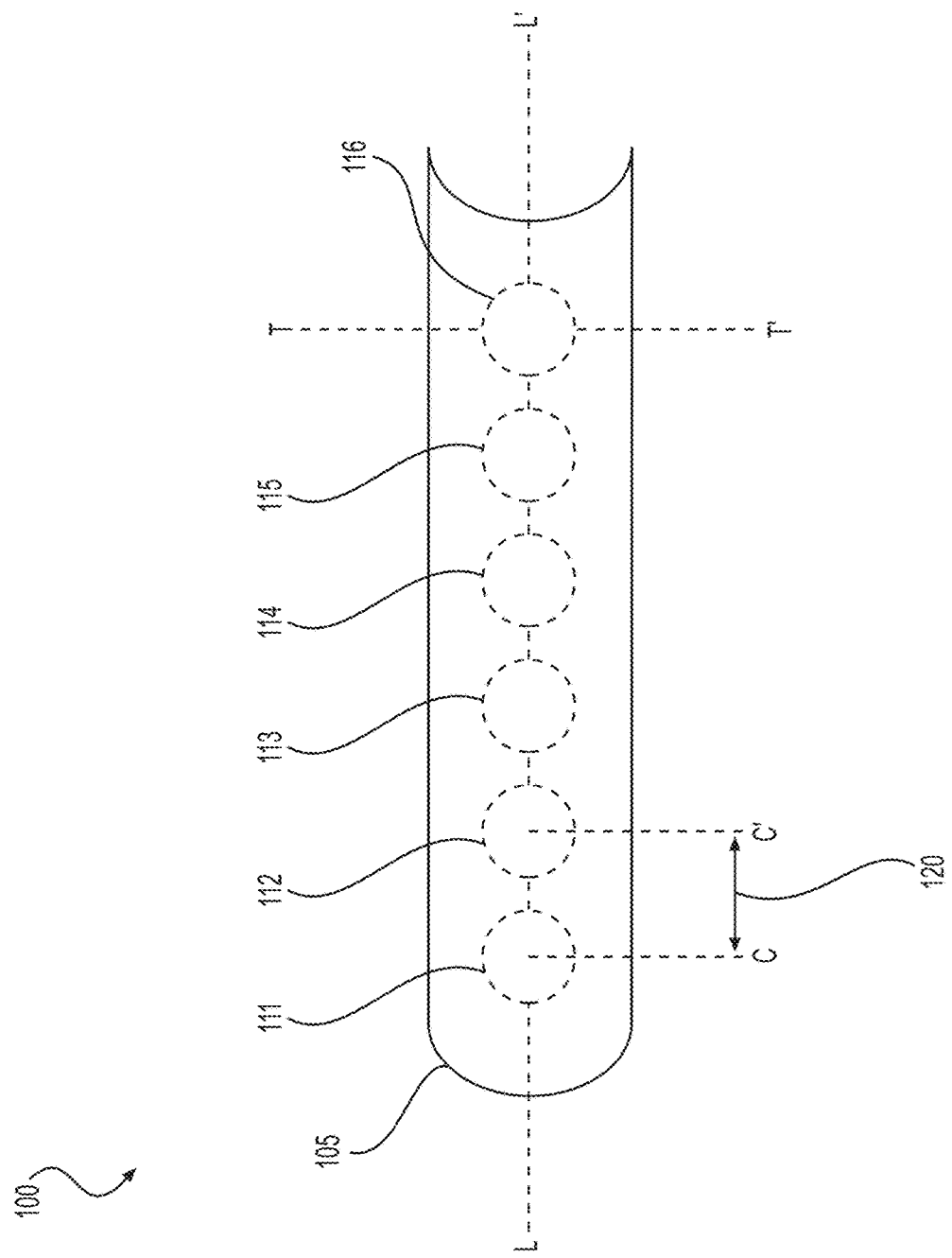
FIG. 1 is a front view of a homogenous LED vehicle lamp, in an embodiment.

FIG. 1 is a front view of an exemplary homogenous LED lamp 100. A diffusion sheet 105 is disposed in front of a plurality of LEDs, such as a first LED 111, a second LED 112, a third LED 113, a fourth LED 114, a fifth LED 115, and a sixth LED 116, which are depicted in FIG. 1 with dashed lines to indicate their location behind diffusion sheet 105. Homogenous LED lamp 100 may include fewer than six or greater than six LEDs without departing from the scope hereof. In certain embodiments, as few as three LEDs may be used, while in other embodiments, greater than fifty LEDs may be used, depending on the length of homogenous LED lamp 100 and the intensity of the individual LEDs.

In certain embodiments, first through sixth LEDs 111-116 are arranged in a single string-array of LEDs aligned linearly along a longitudinal axis, marked by a L-L' dashed line in FIG. 1. In some embodiments, one or more additional arrays of LEDs may be provided above or below LEDs 111-116 along a transverse axis, marked by a T-T' dashed line, which is perpendicular to the L-L' longitudinal axis. The one or more additional arrays of LEDs may be aligned directly above/below, or offset from, first through sixth LEDs 111-116.

A center-to-center distance 120 is illustrated in FIG. 1 between C and C' dashed lines corresponding to the distance between the center of first LED 111 and the center of second LED 112. The center-to-center distance of LEDs 111-116 may be determined based on individual LED properties, such as LED luminance and diameter, as well as a desired light emission profile of homogenous LED lamp 100. In some embodiments, the LED diameter is less than 13 mm. In one embodiment, the LED diameter is about 10 mm. In another embodiment, the LED diameter is about 8 mm. In yet another embodiment, the LED diameter is about 5 mm. The light emission profile is based on a cone angle of the LED, which depends on the required prescription (e.g., to meet regulatory requirements), in combination with a preference to prevent or minimize "hot spots". Hot spots are portions of a lamp that appear brighter than other portions. In some embodiments, center-to-center distance 120 is between about 10 mm and 25 mm. In other embodiments, center-to-center distance 120 is between about 10 mm and 15 mm. In one embodiment, center-to-center distance 120 is about 13 mm.

Diffusion sheet 105 may be curved about longitudinal axis L-L'. The radius-of-curvature of diffusion sheet 105 about longitudinal axis L-L' is between about 1 mm and 100 mm, and more preferably between about 5 mm and 20 mm. The curvature of diffusion sheet 105 may be best viewed from the cross-sectional view provided in FIG. 2, described below. In certain embodiments, the curvature of diffusion sheet 105 bends symmetrically about a midpoint (see FIG. 2). For example, diffusion sheet 105 may have a semi-circular curvature forming a half-cylindrical shape. The material used to form diffusion sheet 105 may be a transparent or semi-transparent material that smooths uneven light distribution. In an embodiment, diffusion sheet 105 is a Luminit™ light-shaping diffuser (Luminit, LLC. Torrance, Calif.). Diffusion sheet 105 may be used to smooth light distribution from individual LEDs, such as first through sixth LEDs 111-116, to provide a more uniform and homogenous appearing light source.

Figure 2:
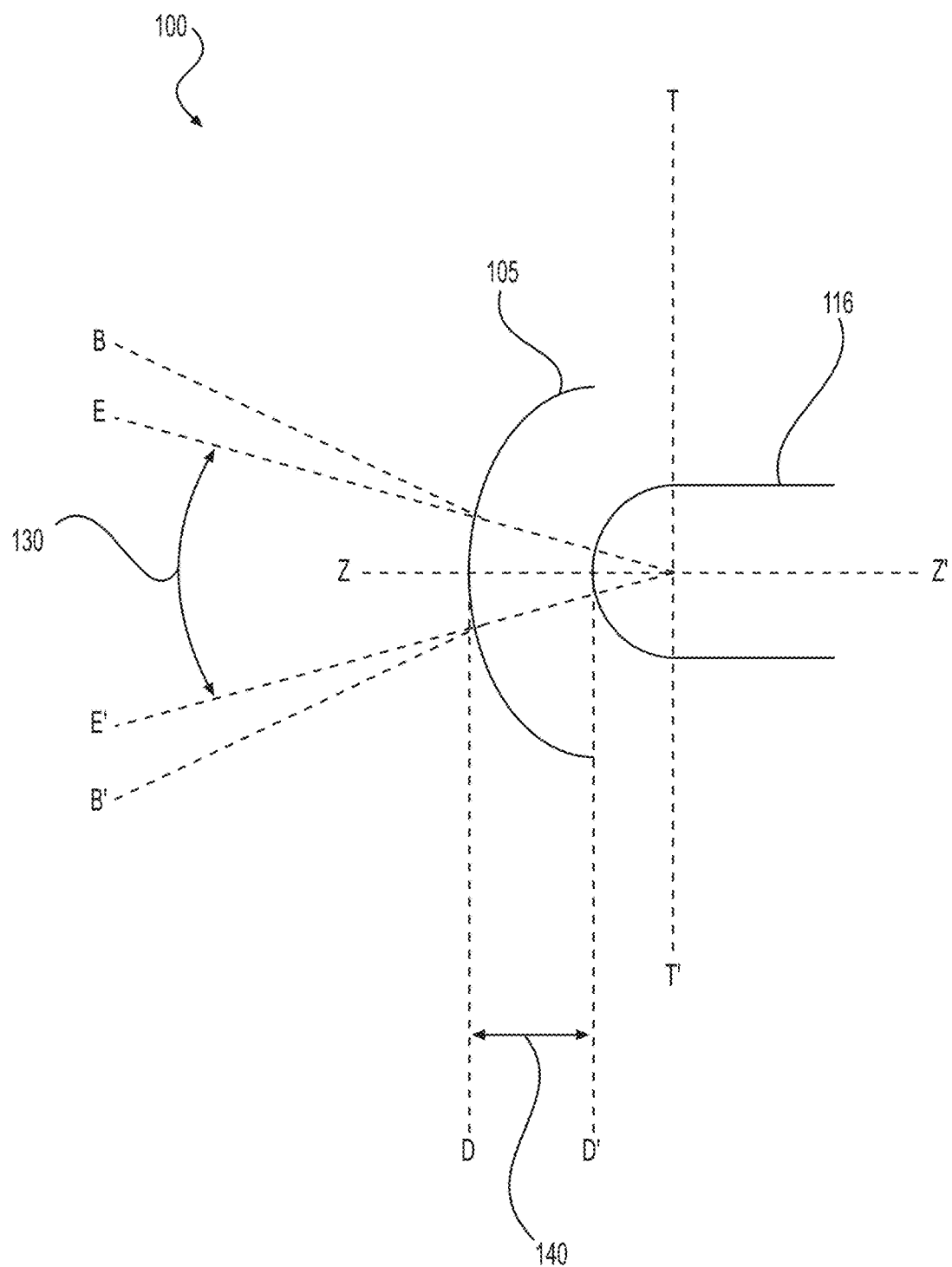
FIG. 2 is a cross-sectional side view of the homogenous LED vehicle lamp of FIG. 1.

FIG. 2 is a cross-sectional side view of homogenous LED lamp 100, FIG. 1. The cross-sectional view shows sixth LED 116 in proximity to diffusion sheet 105. Sixth LED 116 is centrally aligned along a zenith axis, marked by a Z-Z' dashed line in FIG. 2. In certain embodiments, a midpoint of diffusion sheet 105 is aligned with the zenith axis Z-Z', such that a center of curvature of diffusion sheet 105 is aligned with a central axis or midpoint of sixth LED 116. Homogenous LED lamp 100 focuses light output intensity from LEDs 111-116 to create an appearance of smooth homogeneity while meeting functional luminance requirements, as described below.

A maximum intensity of light emitted from sixth LED 116 occurs along the zenith axis Z-Z'. Light intensity diminishes as an angle of emitted light deviates above or below the zenith axis Z-Z'. A cone of light emitted from LED 116 may be described as having cone edges, marked as dashed lines E and E' in FIG. 2, and a beam angle 130, which is an angle between the cone edges. In some embodiments, the cone edges are defined as the portion of light distribution at which fifty percent of the maximum intensity of light is emitted. Beam angle 130 is determined by properties of the LED and may vary from a very narrow spot LED of less than seven degrees to very wide flood LED of more than one-hundred-sixty degrees. In an embodiment, beam angle 130 is about thirty degrees, which sufficiently reduces loss of light per distance away from sixth LED 116.

Light emitted by first through sixth LEDs 111-116 may be diffused and bent as it passes through diffusion sheet 105. Specifically, the curvature of diffusion sheet 105 contributes to both the appearance and functionality of emitted light by altering the angle of light emitted from LEDs 111-116. For example, light emitted from sixth LED 116 through diffusion sheet 105 may be configured to meet certain luminance requirements including, for example, a ten-degree upward angle and a five-degree downward angle. In certain embodiments, diffusion sheet 105 may be configured to broaden the beam angle compared to beam angle 130, by bending light output from sixth LED 116. For example, fifty percent of the maximum intensity of light may emitted at the bent cone edges, marked by B-B' dashed lines in FIG. 2, instead of at the LED cone edges marked by E-E' dashed lines.

A distance 140 between sixth LED 116 and diffusion sheet 105, which is marked with dashed lines D-D' in FIG. 2, is adapted for providing the overall desired beam angle and appearance of light emitted from homogenous LED lamp 100. In an embodiment, distance 140 is about half of the radius of curvature of diffusion sheet 105 at the midpoint of diffusion sheet 105. In another embodiment, distance 140 is between about half of the radius of curvature of diffusion sheet 105 to about equal the radius of curvature of diffusion sheet 105.

Figure 3:
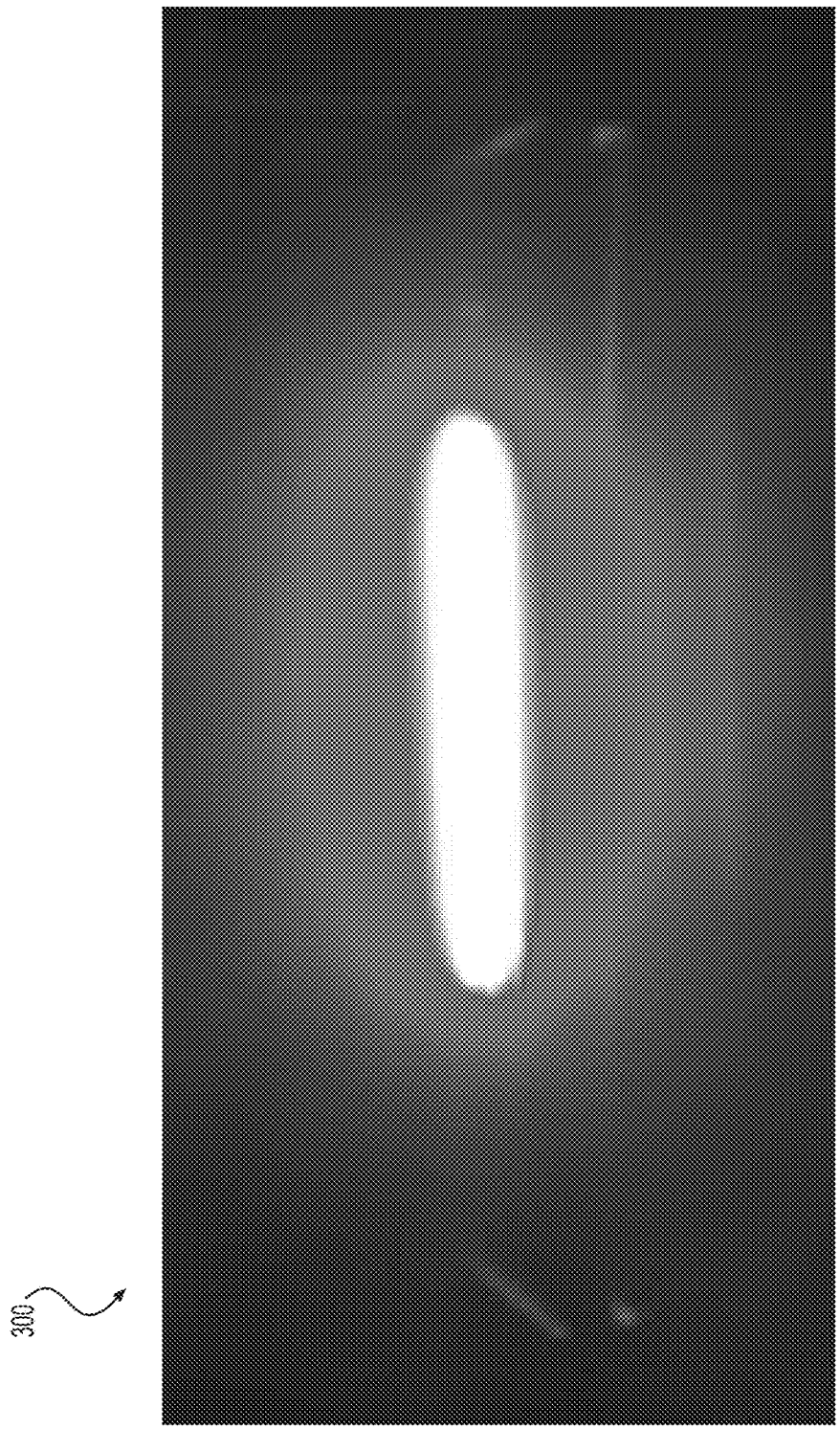
FIG. 3 is a perspective view of a homogenous LED vehicle lamp, in an embodiment.

FIG. 3 is a perspective view of an exemplary homogenous LED lamp 300 in operation on a vehicle. Homogenous LED lamp 300 is an example of homogenous LED lamp 100, FIG. 1, configured as a vehicle Center-High-Mounted Stop Lamp (CHMSL). CHMSLs are required by U.S. Federal Motor Vehicle Safety Standard 108 (Code of Federal Regulations, Title 49, Section 571.108) for all passenger cars and light trucks. FIG. 3 illustrates exemplary diffuse light emitted by homogenous LED lamp 300 in a dark environment.

In some embodiments, a substantially homogeneous appearance from homogenous LED lamp 300 is provided when viewed from above or below a midpoint of the diffusion sheet by about fifteen degrees (+/−15°). In other embodiments, the substantially homogenous appearance is provided when viewed from above or below the midpoint by about sixty degrees (+/−60°). In certain embodiments, a homogeneous appearance is provided when viewing homogenous LED lamp 300 through an opening of a blackout surface of the rear windshield, while maintaining a maximum contrast ratio of three-to-one (3:1). In some embodiments, the contrast ratio is at least three-to-one.

Figure 4:
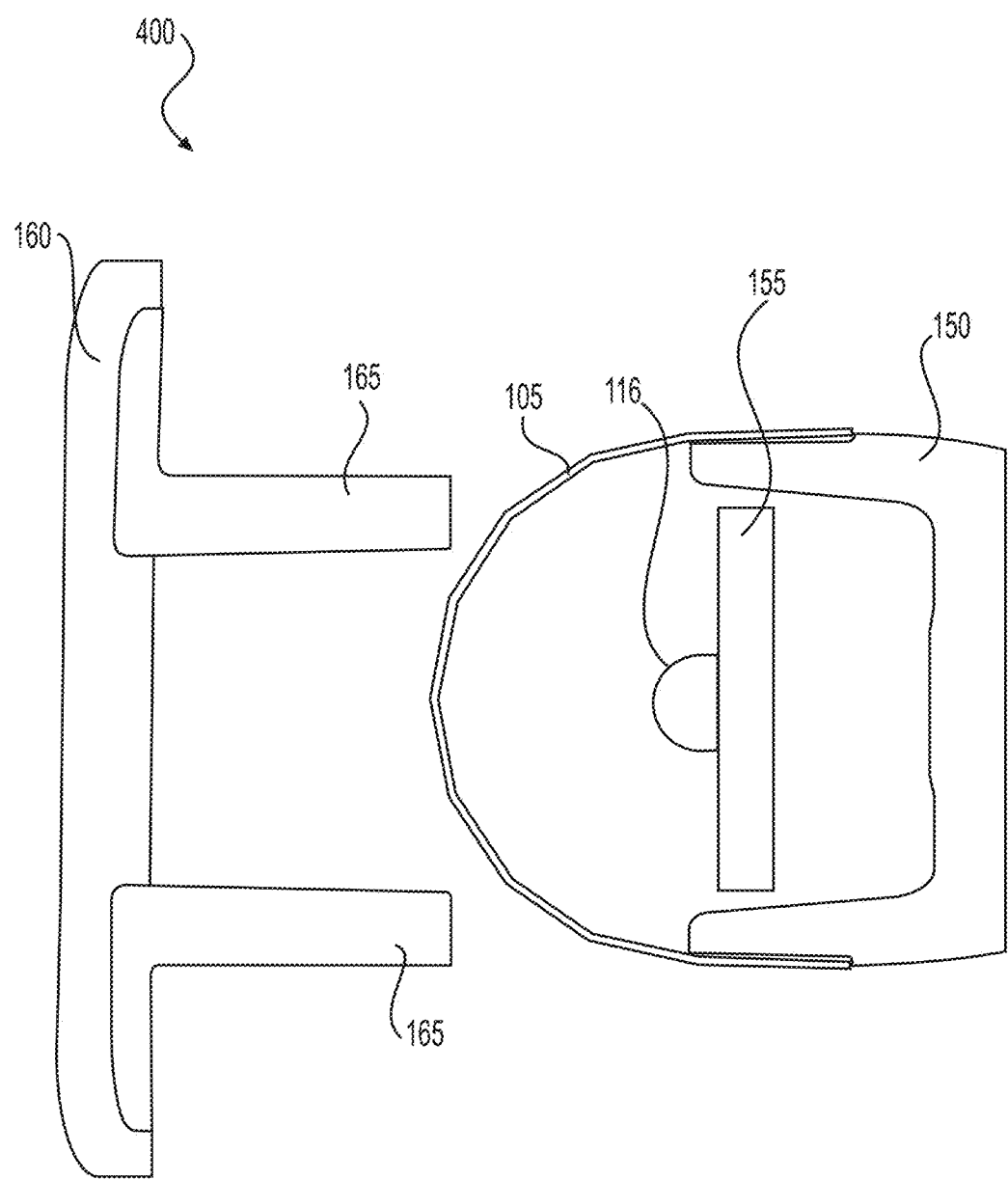
FIG. 4 is a cross-sectional side view of a homogenous LED vehicle lamp, in an embodiment.

FIG. 4 is a cross-sectional side view of an exemplary homogenous LED vehicle lamp 400. First LED 111 is mounted to a printed circuit board 155 for providing electrical power and control of first LED 111. A housing 150 is used to secure the printed circuit board 155 and diffusion sheet 105. First LED 111 and diffusion sheet 105 are aligned in proximity with a lamp lens, including a transparent outer lens 160 and an opaque inner lens 165. Outer lens 160 is made of a transparent material configured to protect inner portions of lamp 400 from outside elements while allowing light from the first LED 111 to pass through. In certain embodiments, outer lens 160 is a colored transparent lens for creating a colored appearance (e.g., a red lens for a vehicle stop light) from a white light source (e.g., a white LED). Inner lens 165 is made of an opaque material adapted for use as an absorbing element.

In certain embodiments, diffusion sheet 105 is a hybrid diffusion sheet, which functions partially as a collimator by redirecting at least a portion of the upward and downward light for redirecting wasted light to the beam pattern. For example, at least a portion of light traveling in an upward direction above first LED 111 is redirected downward, and at least a portion of light traveling in a downward direction below first LED 111 is redirected upward. For light traveling horizontally, diffusion sheet 105 works as a diffuser to smooth the light as described above in connection with FIGS. 1-3.

Advantages of the embodiments of the present disclosure include providing a uniform and homogenous LED light output capable of meeting output angle requirements without needing complex inner lenses.

Features described above as well as those claimed below may be combined in various ways without departing from the scope hereof. The following examples illustrate some possible, non-limiting combinations:

(A1) A homogenous light-emitting diode (LED) lamp for an automotive vehicle may include a plurality of LEDs configured as a LED array, and a diffusion sheet having a curvature aligned with the LED array for smoothing and bending light emitted by the plurality of LEDs for the purpose of creating a lighting appearance substantially lacking hotspots.

(A2) For the lamp denoted as (A1), the LED array may include at least one linear array of LEDs aligned along a longitudinal axis.

(A3) For the lamp denoted as either or both of (A1) or (A2), the diffusion sheet may have a curvature along a transverse axis, perpendicular to the longitudinal axis, such that the diffusion sheet curves at least partially around the longitudinal axis.

(A4) For the lamp denoted as any one or more of (A1) through (A3), a LED midpoint of each of the plurality of LEDs may be aligned with a midpoint of the diffusion sheet.

(A5) For the lamp denoted as any one or more of (A1) through (A4), the curvature of the diffusion sheet may be symmetrical about either side of the midpoint of the diffusion sheet.

(A6) For the lamp denoted as any one or more of (A1) through (A5), the curvature of the diffusion sheet may have a semi-circular curvature that forms a half-cylindrical shape.

(A7) For the lamp denoted as any one or more of (A1) through (A6), the diffusion sheet may bend light emitted from the LED array to a broader cone angle than that of the LED array.

(A8) For the lamp denoted as any one or more of (A1) through (A7), a first distance between each of the plurality of LEDs along the longitudinal axis may be between about 10 mm to about 15 mm.

(A9) For the lamp denoted as any one or more of (A1) through (A8), a second distance between the LED array and the diffusion sheet may be between about half of a radius of curvature of the diffusion sheet to about equal the radius of curvature of the diffusion sheet.

(B1) An automotive vehicle lamp for producing homogenous light may include a plurality of LEDs each positioned a first distance apart from one another to form an array of LEDs, and a diffusion sheet positioned a second distance from the array of LEDs for smoothing light emitted from the array of LEDs. The first distance and the second distance may be arranged for the purpose of providing a substantially homogenous light output from the vehicle lamp when viewed through the diffusion sheet.

(B2) For the vehicle lamp denoted as (B1), each of the plurality of LEDs may have a LED midpoint, and the array of LEDs may be arranged such that the LED midpoint for each of the plurality of LEDs may be aligned with a diffusion sheet midpoint.

(B3) For the vehicle lamp denoted as either or both of (B1) or (B2), the diffusion sheet may be curved symmetrically about the diffusion sheet midpoint for bending light emitted from the array of LEDs.

(B4) For the vehicle lamp denoted as any one or more of (B1) through (B3), the curvature of the diffusion sheet may contribute to both the appearance and functionality of emitted light by altering the angle of light emitted from LEDs.

(B5) For the vehicle lamp denoted as any one or more of (B1) through (B4), the diffusion sheet may be curved to broaden a cone angle of light emitted from the array of LEDs.

(B6) For the vehicle lamp denoted as any one or more of (B1) through (B5), the substantially homogenous light output may appear substantially homogeneous when viewed from above or below the diffusion sheet midpoint by an angle of up to sixty degrees.

(B7) For the vehicle lamp denoted as any one or more of (B1) through (B6), light output intensity from the array of LEDs may be focused to create an appearance of smooth homogeneity while meeting functional luminance requirements.

(B8) For the vehicle lamp denoted as any one or more of (B1) through (B7), the functional luminance requirements may include about a ten-degree upward angle and about a five-degree downward angle.

(B9) For the vehicle lamp denoted as any one or more of (B1) through (B8), a maximum contrast ratio of three-to-one may be maintained while viewing the vehicle lamp through an opening of a blackout surface of a rear windshield.

(B10) For the vehicle lamp denoted as any one or more of (B1) through (B9), the first distance may be a center-to-center distance between the plurality of LEDs, the first distance may be between about equal to a diameter of each LED to about twice the diameter of each LED, and the second distance may be between about half the diameter of each LED to about equal the diameter of each LED.

(B11) For the vehicle lamp denoted as any one or more of (B1) through (B10), the vehicle lamp may be configured to function as a center-high-mounted stop lamp (CHMSL).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A homogenous light-emitting diode (LED) lamp for an automotive vehicle, comprising:
   a plurality of LEDs configured as a LED array, the LED array having at least one linear array of LEDs aligned along a longitudinal axis;
   a diffusion sheet having a curvature along a transverse axis, perpendicular to the longitudinal axis, such that the diffusion sheet curves at least partially around the longitudinal axis for smoothing and bending light emitted by the LED array for the purpose of creating a lighting appearance substantially lacking hotspots; and
   wherein a first distance between each of the plurality of LEDs along the longitudinal axis is between about 10 mm to about 15 mm.

2. The homogenous LED of claim 1, wherein a LED midpoint of each of the plurality of LEDs is aligned with a midpoint of the diffusion sheet.

3. The homogenous LED of claim 2, wherein the curvature of the diffusion sheet is symmetrical about either side of the midpoint of the diffusion sheet.

4. The homogenous LED of claim 1, wherein the curvature of the diffusion sheet has a semi-circular curvature that forms a half-cylindrical shape.

5. The homogenous LED of claim 1, wherein the diffusion sheet bends light emitted from the LED array to a broader cone angle than that of the LED array.

6. The homogenous LED of claim 1, wherein a second distance between the LED array and the diffusion sheet is between about half of a radius of curvature of the diffusion sheet to about equal the radius of curvature of the diffusion sheet.

7. An automotive vehicle lamp for producing homogenous light, the vehicle lamp comprising:
- a plurality of LEDs each positioned a first distance apart from one another to form an array of LEDs, the first distance being a center-to-center distance between each of the plurality of LEDs; and
- a diffusion sheet positioned a second distance from the array of LEDs for smoothing light emitted from the array of LEDs,
- wherein the first distance is between about equal to a diameter of each LED to about twice the diameter of each LED, and the second distance is between about half of a radius of curvature of the diffusion sheet to about equal the radius of curvature of the diffusion sheet for the purpose of providing a substantially homogenous light output from the vehicle lamp when viewed through the diffusion sheet.

8. The vehicle lamp of claim 7, wherein each of the plurality of LEDs has a LED midpoint, and the array of LEDs is arranged such that the LED midpoint for each of the plurality of LEDs is aligned with a diffusion sheet midpoint.

9. The vehicle lamp of claim 8, wherein the diffusion sheet is curved symmetrically about the diffusion sheet midpoint for bending light emitted from the array of LEDs.

10. The vehicle lamp of claim 7, wherein the curvature of the diffusion sheet contributes to both the appearance and functionality of emitted light by altering the angle of light emitted from LEDs.

11. The vehicle lamp of claim 7, wherein the diffusion sheet is curved to broaden a cone angle of light emitted from the array of LEDs.

12. The vehicle lamp of claim 7, wherein the substantially homogenous light output appears substantially homogeneous when viewed from above or below the diffusion sheet midpoint by an angle of up to sixty degrees.

13. The vehicle lamp of claim 7, wherein light output intensity from the array of LEDs is focused to create an appearance of smooth homogeneity while meeting functional luminance requirements.

14. The vehicle lamp of claim 13, wherein the functional luminance requirements include about a ten-degree upward angle and about a five-degree downward angle.

15. The vehicle lamp of claim 7, wherein a maximum contrast ratio of three-to-one is maintained while viewing the vehicle lamp through an opening of a blackout surface of a rear windshield.

16. The vehicle lamp of claim 7, wherein the second distance is between about half the diameter of each LED to about equal the diameter of each LED.

17. The vehicle lamp of claim 7, wherein the vehicle lamp is configured to function as a center-high-mounted stop lamp (CHMSL).

* * * * *